Patented Mar. 4, 1941

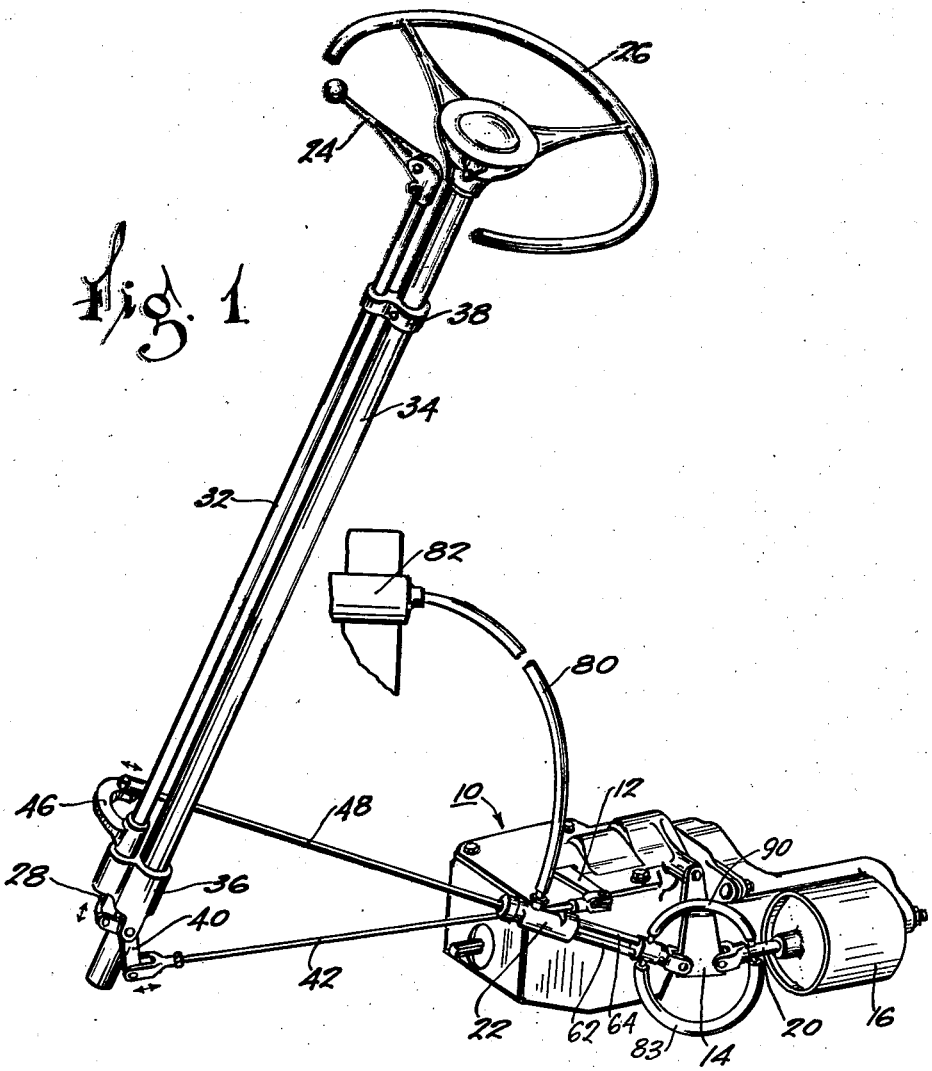
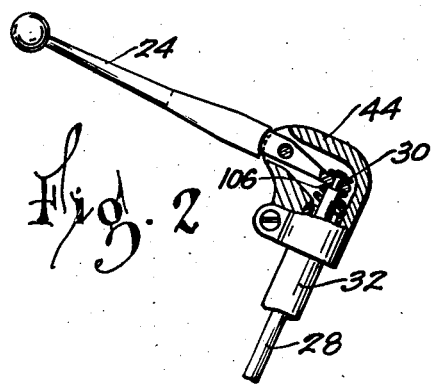

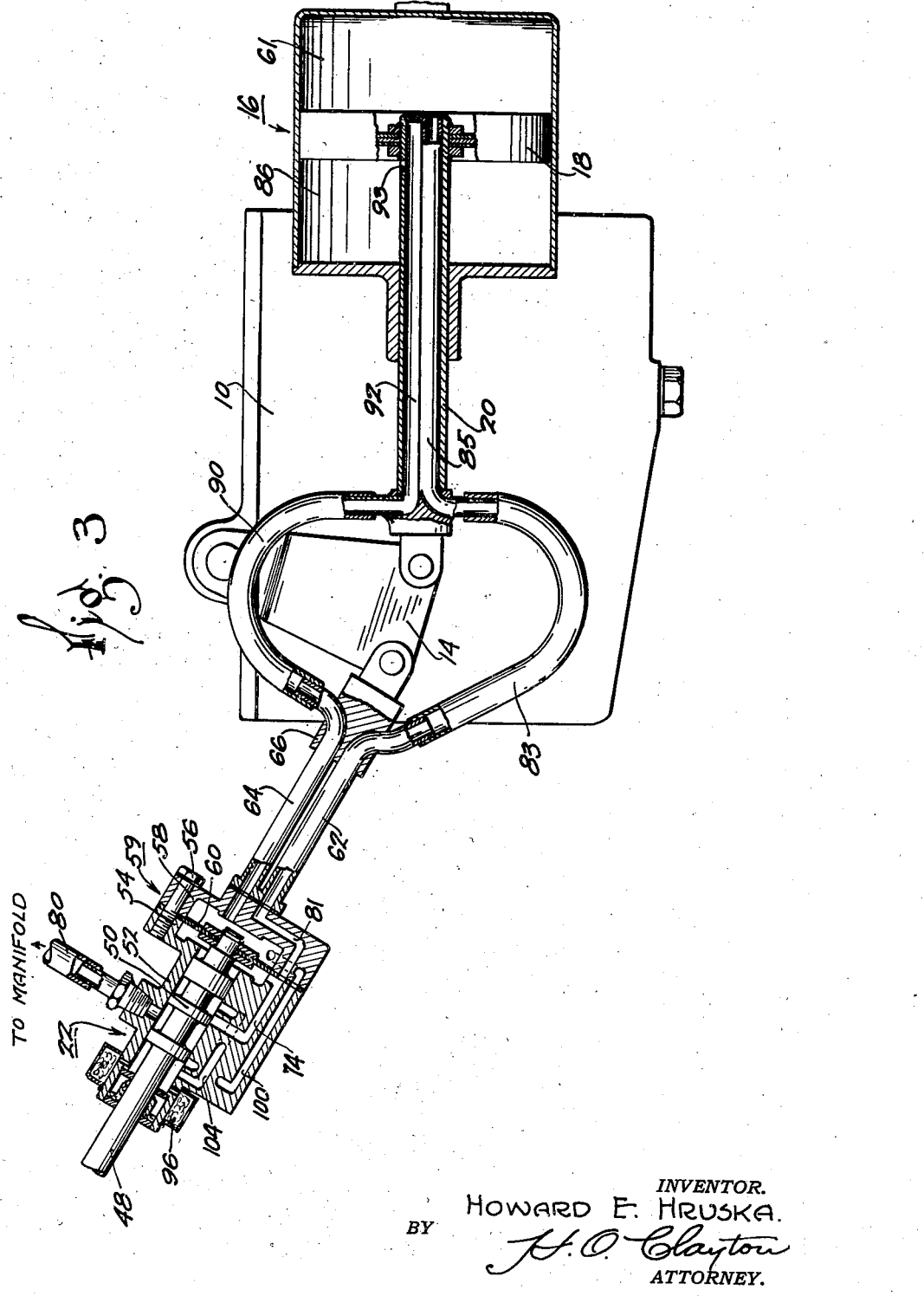

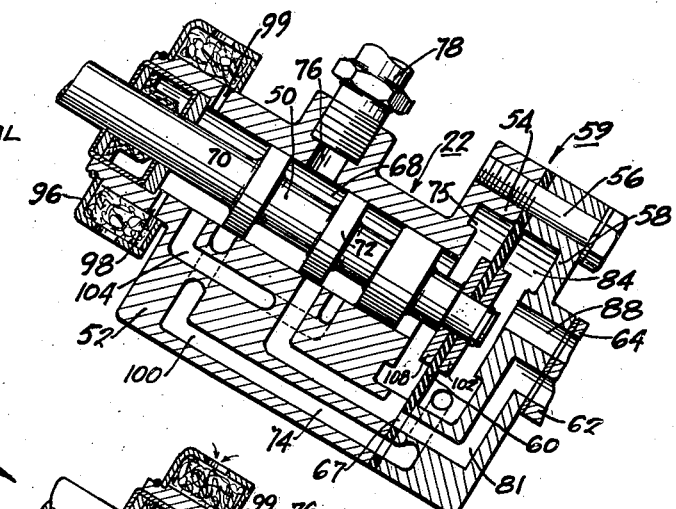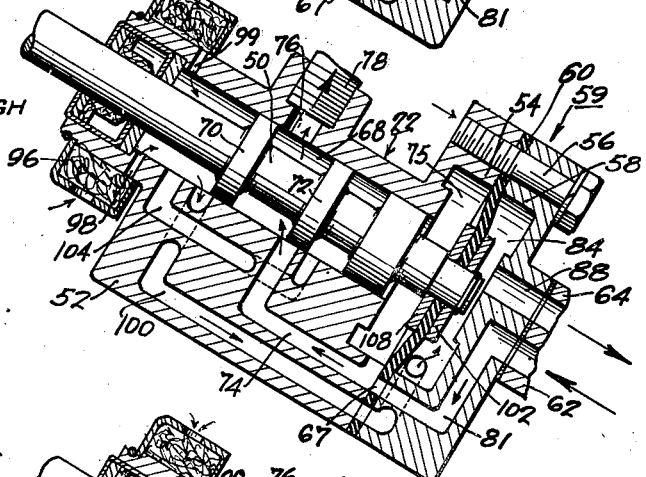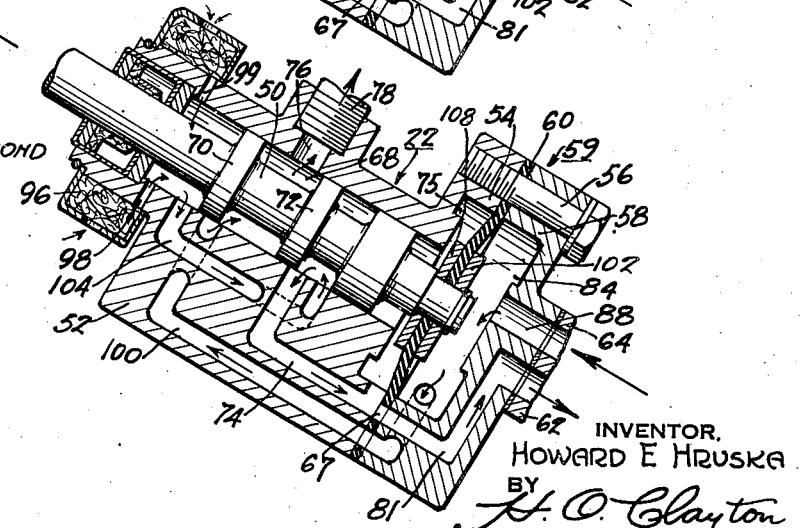

2,234,003

UNITED STATES PATENT OFFICE 2,234,003

TRANSMISSION CONTROL

Howard E. Hruska, South Bend, Ind., assignor to Bendix Aviation Corporation, South Bend, Ind., a corporation of Delaware Application January 16, 1939, Serial No. 251,169

2 Claims. (Cl. 74—335)

This invention relates to motor vehicles and more particularly to controlling means for the change-speed transmission thereof.

Motor vehicles in general use have transmission gear sets which provide various torque or speed ratios between the motor and the rear wheels. The common way of selecting and engaging these gear sets is by means of a manually movable lever conveniently located near the hand of the driver.

There have been proposed various substitutes for the transmission and the transmission gear shifting lever, various positions for the shifting lever, and other modifications of the present generally used system, all designed for the purpose of simplifying the operations required of the driver. Some of these proposals are automatic, or semi-automatic, in their action, but most of them are more complicated to design, to manufacture and to service than is the construction now in general use, and they are, for these reasons, objectionable. On the other hand, there are definite objections to the construction now in general use and there is definite need for improvement, if such improvement may be accomplished without running into the complications which form so powerful an obstacle to the prior proposals.

One of the objections to the present system is the length of movement required of the gear shift lever or, if the movement is small, the relatively large force required to move said lever. It is also to be noted that the present-day gear shift lever constitutes an obstruction in the driver's compartment and prevents complete freedom of movement of the driver and other occupants.

It is therefore one of the objects of the present invention to provide a transmission gear control mechanism so constituted as to avoid the above-referred-to difficulties.

Another object of the invention is to provide a power operated selective gear shifting mechanism so constructed and arranged that the movements of the same in effecting a control of the changing of the transmission gearing closely simulate the corresponding movements of a conventional manually operable gear shift lever to the end that an operator may readily operate a vehicle equipped with such mechanism in the same manner as if the vehicle were provided with a manually operable gear shift.

A further object is to provide, in a manually controlled power operated gear shifting mechanism, a novel control apparatus therefor including an arrangement insuring that the extent of movement of the gear shifting member, e. g., the selected shift rail, will be substantially proportional to the extent of movement of the control member, whereby an exceedingly accurate control may be exercised by the operator over the shifting of the gears. Such a mechanism is known in the art as a follow-up control, and in one embodiment of my invention there is disclosed a so-called line type of follow-up valve for controlling an air-suspended motor operable to establish the transmission in any one of its four settings.

A still further object is to provide a fluid pressure operated power gear shifting mechanism having a manually operable control member and means controlled thereby in such a manner that the movements of such control member to effect a shifting of the transmission gears will be resisted at all times by a force proportional to the force exerted by the transmission operating power mechanism, whereby a "feel" or reaction to shifting will be experienced by the operator in a manner simulating the reaction encountered in manually shifting transmission gears in the conventional manner.

Yet another object of the invention is to provide a power gear shifting mechanism having a manually operable control member, the movement of which, when the synchronizer of the transmission is functioning, is resisted by a force proportional to the extent of movement of the control member.

A further object of the invention is to provide a combined power and manually operated three-speeds forward and reverse transmission operating mechanism, wherein the selection of the shift rail to be operated is effected by manually operated means, and the operation of the shift rails to place the transmission in gear is effected by means normally operated by power alone, but which may be operated partly by the power means and partly by the physical effort of the driver, or solely by the physical effort of the driver should the power means fail completely.

One of the most important objects of the invention is to provide a simple, compact and cheaply constructed pressure differential operated transmission operating motor and control valve therefor, the latter being positioned outside the motor and accordingly constituting a so-called external valve.

Yet another object of the invention is to provide a plurality of pressure differential operated motors for operating the transmission of an automotive vehicle, both of said motors being controlled by a common valve.

Yet another object of my invention is to provide a transmission operating mechanism wherein the control valve of a shift rail operating motor constitutes a force transmitting element in the connection between a manually operated selector or control member and the power element of the motor, the parts being so constructed and arranged that manual operation of the selector normally merely operates the valve to energize the motor. However, in the event of complete or partial failure of the power means, the transmission, with operation of the selector, may be operated solely by the physical effort of the driver, or jointly by the power means and the physical effort of the driver.

Other objects of the invention and desirable details of construction and combinations of parts will become apparent from the following description of a preferred embodiment, which description is taken in conjunction with the accompanying drawings, in which:

Figure 1 is a view disclosing the principal elements of the transmission operating mechanism of my invention;

Figure 2 is a view, partly in section, disclosing details of the manually operated selector for controlling the transmission operating mechanism constituting my invention;

Figure 3 is a view, largely in section, disclosing in detail some of the principal elements of my transmission operating mechanism;

Figure 4 discloses, in section, the transmission operating motor and control valve therefor of my invention, the parts being shown in their transmission neutral positions;

Figure 5 is a view, similar to Figure 4, disclosing the relative positions of the parts of the valve, when the valve has been first opened to place the transmission either in low gear or in high gear; and Figure 6 is a view, similar to Figures 4 and 5, disclosing the relative positions of the parts of the control valve, when the valve has been first opened to place the transmission either in second gear or in reverse gear.

In that embodiment of my invention disclosed in the figures of the drawings, a three-speeds forward and reverse transmission 10 of conventional design is operated by the manually and power operated mechanism constituting my invention. This transmission is provided with a crank 12 for operating mechanism to select the shift rail of the transmission to be operated and with a crank 14 for operating mechanism to move the selected rail and place the transmission in gear.

Describing now the principal elements of my invention, the same include a double-acting air-suspended vacuum operated motor 16, the piston or power element 18 thereof being connected by a connecting rod 20 to the crank 14. The motor 16 is controlled by a valve unit 22, preferably incorporated as a force transmitting element in the connection between a manually operated valve operating selector 24 and the crank 14. The selector also serves to operate linkage to operate the crank 12 and thereby select the shift rail to be operated by the motor.

Describing now the operation of the mechanism constituting my invention, and incidentally completing the description of the details of said mechanism, assuming the transmission to be in neutral, as disclosed in Figure 3, and the engine of the vehicle idling, the selector 24 is first rotated counterclockwise, in a plane perpendicular or substantially perpendicular to the plane of the steering wheel 26. This operation serves to rotate the crank 12 counterclockwise to operate mechanism within the transmission that effects a selection of the low and reverse shift rail. The connection between the selector 24 and the crank 12 includes a rod 28, pivoted to the selector at 30 and extending through a tube 32 which is secured to the steering column 34 by brackets 36 and 38. The rod 28 is pivotally connected, at its lower end, to a bell crank lever 40, which is pivotally mounted on the bracket 36. A link 42, pivotally connected at its ends to the bell crank lever 40 and to the crank 12, completes this connection.

After the low and reverse shift rail has been selected for operation, it is then necessary to energize the motor 16 to place the transmission in low gear. To effect this operation, the selector 24 is rotated clockwise, in a plane parallel or substantially parallel to the plane of the steering wheel 26. The movement of the selector serves, through the intermediary of a selector casing 44 secured to the tube 32, to rotate the latter clockwise about its longitudinal axis. This operation serves to rotate a crank 46, fixedly secured to the tube, and to place a link 48, connected to the crank, in compression. To one end of the link 48 there is secured a spool-like valve member 50 reciprocable within a valve casing 52. The spool-like member and casing constitute relatively movable valve members, said members together making up the aforementioned valve unit. One end of the casing is enlarged, as disclosed in Figures 3 to 6, inclusive, to provide a cup-like member 54. To the latter member there is detachably secured, by fastenings 56, a cup-shaped member 58. A flexible diaphragm 60, secured at its central portion to one end of the aforementioned spool valve member 50, is clamped between the cup-shaped members 54 and 58.

The members 54 and 58, together with the diaphragm 60, constitute a motor unit 59 or pressure differential means for aiding the motor 16 in operating the shift rails of the transmission. However, the principal function of this pressure differential operated means is to resist the movement of the selector, all of which will be described in greater detail hereinafter. This motor unit 59, as with the valve 22, comprises two major parts which are relatively movable with respect to each other. The casing or housing 54, 58 constitutes one of said major parts and the diaphragm 60 the other, the parts 54 and 58 being connected directly to the crank 14 and the diaphragm 60 to the selector 24. To the central portion of the member 58 are fixedly secured ends of two parallel tubes 62 and 64, preferably of steel or any other rigid material suitable for the purpose. These tubes are secured at their other ends to a fitting 66, the latter being pivotally secured to the crank 14.

Continuing the description of the operation of the mechanism to place the transmission in low gear, the first increment of movement of the selector 24 serves, through the intermediary of the casing 44, tube 32, crank 46 and link 48, to move the valve member 50 to the right to thereby place the valve parts in their relative positions disclosed in Figure 5. In this position of the parts, a recess 68, outlined by a small-bodied portion of the valve member and by spaced full-bodied portions 70 and 72, is placed in registry with an angularly extending duct 74 in the body of the valve casing 52. The duct 74 provides a fluid transmission connection between the recess 68 and a motor chamber 75, outlined by the cup member 54 and the diaphragm 60: and the chamber 75 and duct 74 are at all times in fluid transmitting connection with a chamber 61 in the motor 16 via an opening 67 in the diaphragm 60, an angularly shaped duct 81 in the cup member 58, the tube 62, a flexible tube 83 and a tube 85 in the rod 20. A port 76 in the valve casing registers at all times with the recess 68, this port providing, together with a plug 78 and a conduit 80, a connection between the recess 68 and the intake manifold 82 of the internal-combustion engine of the vehicle.

It is evident therefore that when the valve member 50 is moved to the right to crack the valve the chamber 75 of motor 59 and the chamber 61 of motor 16 are connected to the intake manifold. The cup-shaped member 58, together with the diaphragm 60, outlines a second motor chamber 84. This chamber 84 is in fluid transmitting connection with a chamber 86 in the motor 16 by means of a port 88 in the member 58, the rigid tube 64, a flexible tube 90, a tube 92 within the rod 20 and a port 93 in the end of the rod 20 adjacent the piston 18. Movement of the valve member 50 to the right places the chamber 86 within the motor 16 in fluid transmitting connection with the atmosphere via an air cleaner 96, ports 98 and 99 in the valve casing 52, an angularly shaped duct 100 in said casing, a duct 101 in the member 58 leading to the motor chamber 84, the port 88 in the member 58, the rigid tube 64, the flexible tube 90 and the tube 92, also housed within the rod 20.

It will be remembered that the valve 22 is opened when the engine is idling. Accordingly, the intake manifold provides a source of vacuum, for, as is well known in this art, the intake manifold is partially evacuated when the throttle is closed and the engine is idling. The above-described operation of the valve accordingly results in an efflux of air from the motor chambers 75 and 61, the rate of efflux of air being determined by the degree of opening of the valve, that is, the area of the mouth of the duct 74, which is uncovered by the full-bodied portion 72 of the valve member 50. Inasmuch as the motor chambers 84 and 86 are vented to the atmosphere at the time and the chambers 61 and 75 are connected to the intake manifold, it follows that the motor piston 18 and the diaphragm 60 will be subjected to a differential of pressures tending to move them to the right and left respectively.

Inasmuch as the evacuation of air from the chambers 61 and 75 is very rapid, the motor piston 18 will start moving to the right immediately to thus rotate the crank 14 counterclockwise and move the low and reverse shift rail toward its low gear position. The rate of movement of the piston 18 and its connected shift rail is determined by the rate of efflux of air from the chamber 61, and, as above described, this rate of efflux is determined by the degree of opening of the valve.

Now, as soon as the air begins to flow from the motor chamber 75, the resulting force, which tends to move the diaphragm 60 to the left, acts to resist the continued movement of the selector 24 clockwise. The degree of this resistance, or what is defined in this art as "feel," is directly proportional to the force being exerted by the piston 18 as it moves the shift rail; for, inasmuch as the gaseous pressure within the motor chamber 75 is always the same as the gaseous pressure within the motor chamber 61, it follows that the resistance to movement of the selector is directly proportional to the force exerted by the piston 18. This force increases appreciably when the synchronizer of the transmission begins to function, for the resistance to movement of the piston 18 then encountered causes the same to momentarily stop, or at least slow down appreciably. This action occurs when the blockers of the synchronizer are functioning to bring the gears to be meshed to the same speed.

It follows that with the stopping or slowing up of the piston 18 the gaseous pressure within the chambers 61 and 75 is lowered, resulting in the aforementioned greater resistance to movement of the selector. The advantages resulting from the provision of the members 54 and 58 and the diaphragm 60, together constituting the miniature motor 59, are thus apparent, for there is thus provided means for resisting movement of the selector when the synchronizer of the transmission is functioning, an operation which simulates the manual operation of a conventional manually operated gear shift lever protruding from the floorboard of the driver's compartment. Furthermore, the unit 59 serves in the dual capacity of means for aiding in the operation of actuating the crank 14 and of means for obtaining the desired "feel." Upon encountering this resistance, the driver, in all probability, will reduce his effort in moving the selector, thereby either momentarily stopping or slowing down the movement of the selector and avoiding any appreciable increase in the opening of the valve, that is, increasing the area of the mouth of the duct 74 to which reference was previously made. Such an increase, of course, would result in an undesired amount of force being exerted by the piston 18 upon the blockers of the synchronizer. The members 54, 58 and 60 are defined as a motor, inasmuch as this unit not only provides means for obtaining the desired "feel" but also provides a means for aiding the motor 16 in operating the crank 14; for when the chamber 75 is partially evacuated the atmospheric pressure, acting in the direction of the arrow in Figure 5, would result in the piston 18 and the connected crank 14 being subjected to a load tending to rotate the crank counterclockwise.

Should the driver of the vehicle stop the movement of the selector at any time before or after the synchronizer has completed its work, the valve casing 52 or valve member, as it is also called, which is connected to the piston 18, will continue to move until the valve is closed, the parts being then in the position disclosed in Figure 4. In this position of the valve parts, all of the chambers 61, 75, 84 and 86 of the motors 16 and 59 are vented to the atmosphere, for the piston 18 will move so long as there is a differential of pressures acting on it. The friction between the parts of the mechanism and the weight of the parts resisting the movement of the piston are not sufficient to equal the force tending to move the piston. This operation of the valve is known as a follow-up operation, the crank 14 and its connected shift rail being moved concurrently with the selector, after the latter is moved to open the valve. The successive movements of the valve members 50 and 52 also constitute a follow-up action. If the movement of the crank stops when the synchronizer is functioning, then the follow-up action momentarily ceases. After such a follow-up operation, either before or after the synchronizer has functioned, if the selector is again moved to the right to complete its movement, the valve is again opened and the movement of the piston 18 is resumed to thereby complete the meshing of the gears to establish the transmission in low gear.

Should the power means fail for any reason, then the crank 14 and its connected shift rail will be operated solely by the physical effort of the driver: and in this event movement of the valve member 50 will result in a plate 102, secured to the diaphragm 60 and to said valve member, contacting the inner wall of the motor member 58. Further movement of the selector will then result in moving the crank 14 without the aid of the motor. It should also be noted that at any time during the movement of the selector to maintain the valve open the driver, by moving the valve member 50 to bring the plate 102 into contact with the member 58, may add his physical effort to the force then being exerted by the motor. The driver may unintentionally, or by design, do this when the synchronizer is functioning and the movement of the valve casing 52 is temporarily stopped.

After the transmission has been placed in low gear, the clutch reengaged and the vehicle accelerated to the desired speed, the transmission may then be placed in second gear by again disengaging the clutch and reversing the direction of movement of the selector. The counterclockwise movement of the selector results in the valve member 50 being moved to the position disclosed in Figure 6, resulting in a partial evacuation of motor chambers 84 and 86. The motor chamber 84 is connected to the intake manifold via conduit 80, port 76, recess 68 and duct 100: and the motor chamber 86 is connected to the chamber 84 via port 88, tubes 64, 90 and 92 and the port 93. The motor chamber 75 is vented to the atmosphere via air cleaner 96, ports 98 and 99, a duct 104 and duct 74: and the motor chamber 61 is vented to the atmosphere via motor chamber 75, the opening 67 in the diaphragm 60, duct 81 and tubes 62, 83 and 85. The differential of pressures acting upon the piston 18 and the motor member 58 results in the movement of the crank 14 clockwise to move the low and reverse gear shift rail toward its transmission neutral position. The load upon the diaphragm 60 tending to move it to the right, Figure 6, serves to resist the movement of the selector to the left, as it is moved to neutralize the transmission.

When the selector reaches a position midway its extreme positions, that is, its transmission neutral position, the piston 18 and its connected shift rail have at the time reached their transmission neutral positions, and the valve parts are restored to the position disclosed in Figure 4. The so-called drift-lock or detent mechanism of the transmission, of course, will aid the piston 18 and shift rail in reaching such position, for the spring of this mechanism, when the rail is just short of this position, will snap the rail into place. The selector is then permitted, under the action of a spring 106, to move clockwise, in a plane perpendicular or substantially perpendicular to the plane of the steering wheel, thus effecting an operation of the crank 12 to effect a selection of the second and high gear shift rail of the transmission. The counterclockwise movement of the selector in a plane parallel to the plane of the steering wheel is then resumed, the valve 22 being again opened to the position disclosed in Figure 6, and eventually the transmission will be established in second gear. Inasmuch as this operation, with the exception of the direction of movement of the selector, the valve parts, the piston 18 and the connections, is identical with the operation of the mechanism in placing the transmission in low gear, it will not be described in detail. As with the latter operation, the driver of the vehicle is at all times advised of the force being exerted by the motors 16 and 59, the mechanism operating as a follow-up control: and should the power means fail, the crank 14 may be actuated solely by the physical effort of the driver, when a plate 108 contacts the inner face of the cup-shaped member 54.

The transmission having been established in second gear, it may then be placed in high gear by again reversing the direction of movement of the selector. This operation of the mechanism is, of course, practically identical with that necessary to place the transmission in low gear. In this operation, the selector, of course, is not operated to actuate the crank 12.

There is thus provided a simple mechanism for selecting and operating the shift rails of a so-called step type of selective transmission. The effort necessary to move the selector, when the transmission is being operated solely by the power means, is directly proportional to the force exerted by the power means to move the shift rails: and, by virtue of the follow-up control, the degree of movement of the shift rail, except when the synchronizer is functioning, is directly proportional to the degree of movement of the selector.

A mechanism is thus provided in which the operation of the selector closely simulates the operation of a conventional physically operated shift lever protruding from the floor of the driver's compartment.

While one illustrative embodiment has been described, it is not my intention to limit the scope of the invention to that particular embodiment, or otherwise than by the terms of the appended claims.

I claim:

1. In an automotive vehicle provided with a change-speed transmission, said transmission including a crank for operating selector means within the transmission and another crank for actuating that mechanism within the transmission operative to establish the transmission in gear, means for operating said cranks including, in combination, a manually operated selector mounted within easy reach of the driver of the vehicle, means interconnecting said selector with the first-mentioned crank to operate the same, and other means for operating the second-mentioned crank, said last-mentioned means including a pressure differential operated motor, a valve mechanism having two major relatively movable parts for controlling the operation of said motor, force transmitting means interconnecting the selector, the power element of the motor, the second-mentioned crank and the parts of the valve mechanism, said force transmitting means including a rod connected to the power element of said motor, a plurality of fluid transmitting tubes within said rod and means, including a plurality of inflexible fluid transmitting tubes, interconnecting the second-mentioned crank and the valve mechanism.

2. In an automotive vehicle provided with a change-speed transmission having a crank for operating selector means within the transmission and another crank for actuating that mechanism within the transmission operative to establish the transmission in gear, means for operating said cranks including a double-ended double-acting pressure differential operated motor for operating the second-mentioned crank, a manually operated selector mounted within reach of the driver of the vehicle, a valve mechanism for controlling the operation of the motor including two major parts, namely, a casing and valve plunger member reciprocable within the casing, force transmitting means interconnecting the valve plunger member with the selector, force transmitting means interconnecting the valve casing member, the second-mentioned crank and the power element of the motor, said force transmitting means including a plurality of inflexible fluid transmitting tubes placed in compression or tension when the mechanism is operated to establish the transmission in gear.

HOWARD E. HRUSKA.